United States Patent [19]

Bojarski

[11] Patent Number: 4,646,329
[45] Date of Patent: Feb. 24, 1987

[54] RECOVERY OF FRAME ALIGNMENT WORD HAVING BITS DISTRIBUTED IN A DIGITAL TRANSMISSION SIGNAL

[76] Inventor: Alain Bojarski, 38, rue de Kerangarou, 22700 Perros Guirec, France

[21] Appl. No.: 725,572

[22] Filed: Apr. 22, 1985

[30] Foreign Application Priority Data

Apr. 20, 1984 [FR] France ............................... 84 06324

[51] Int. Cl.$^4$ .............................................. H04L 7/00
[52] U.S. Cl. ................................... 375/116; 375/113; 375/114
[58] Field of Search ................ 370/105; 375/114, 116, 375/111, 113, 115

[56] References Cited

U.S. PATENT DOCUMENTS 3,575,554  4/1971  Schmidt .............................. 375/116

Primary Examiner—Robert L. Griffin
Assistant Examiner—M. Huseman
Attorney, Agent, or Firm—Lowe, Price, LeBlanc, Becker & Shur

[57] ABSTRACT

A frame alignment word has N predetermined bits distributed in the frame of a digital transmission signal. Each frame is divided into a number of sectors. Each sector has a heading made up of a bit or a bit group from the alignment word such that when placed end to end the headings in the frame form the alignment word. According to a frame alignment recovery method, bit groups are successively taken from the digital signal received at the sector frequency, each taken group having a maximum bit number equal to the bit number in each heading. The taken bit groups are compared with the heading bits corresponding in the frame alignment word and N-1 circular permutations thereof. The comparison are halted before reaching the full alignment word once the comparison of bits between the heading bits and taken successive groups reveals some disagreement.

6 Claims, 4 Drawing Figures

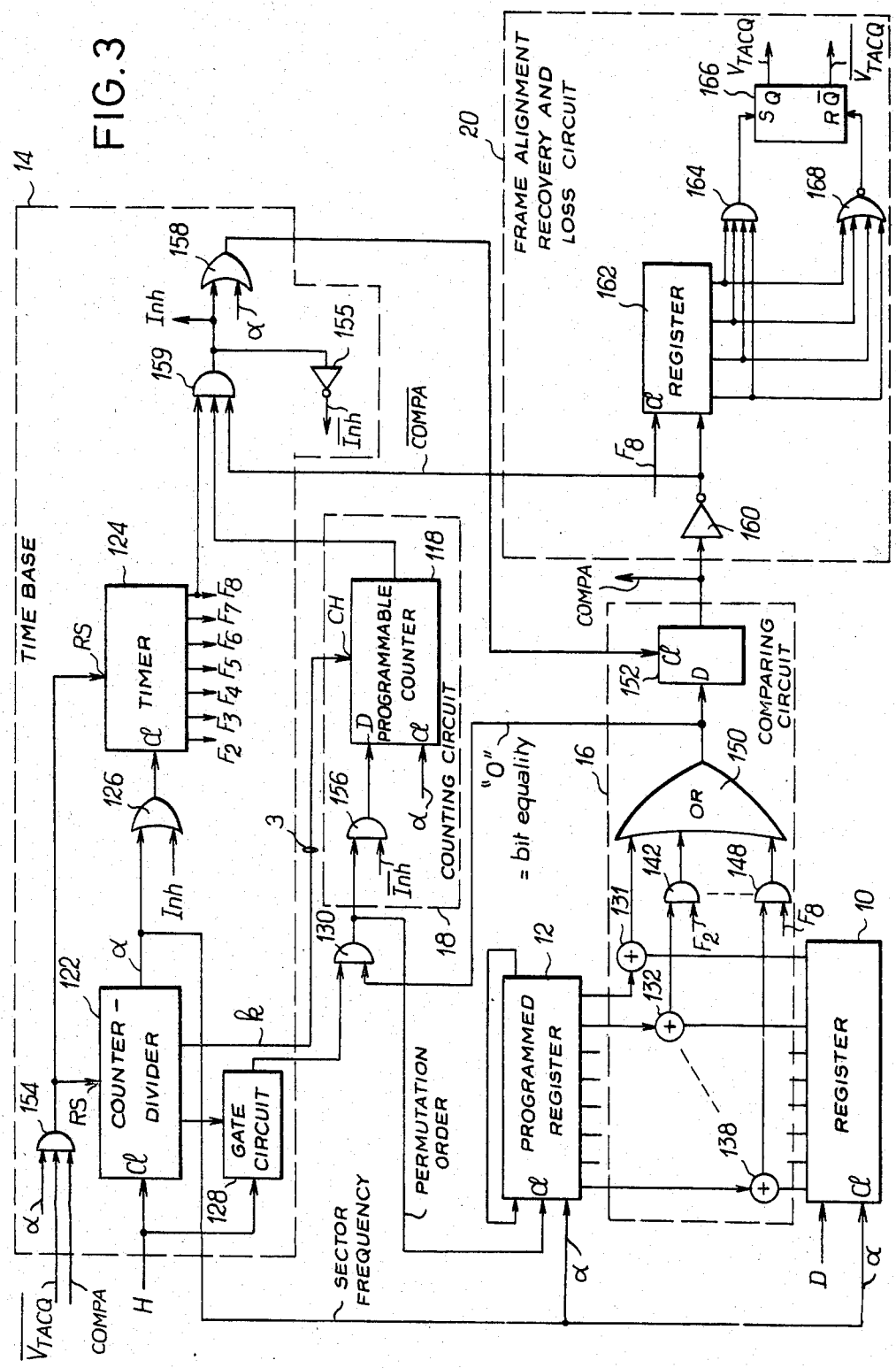

RECOVERY OF FRAME ALIGNMENT WORD HAVING BITS DISTRIBUTED IN A DIGITAL TRANSMISSION SIGNAL

BACKGROUND OF THE INVENTION

1. Field of the Invention

The present invention relates to a method and a device for recovering a frame alignment word in a digital transmission signal wherein a synchronization information is constitued of a binary alignment word having N bits that are distributed in the frame of the digital signal.

2. Description of the Prior Art

Such a synchronization method has already been used in radio channel transmission having a bit-rate lying between 2 and 280 Mbit/s. Methods then implemented for recovering frame alignment are that much faster the higher the bit-rate. This is why the frame alignment recovery times remain within acceptable limits.

In telephone systems where digitalization of the subscriber line is currently under development, it is planned to use a synchronization pattern of the distributed type, as broached earlier. However, in this case, the bit-rate to be taken into consideration for transmission is a basic value equal to the information bit-rate between the subscriber telephone installation and a telephone exchange. From a practical viewpoint, the value of the bit-rate chosen is 160 kbit/s corresponding to a useful information rate of 144 kbit/s. For these digital bit-rate values, the usual frame alignment recovery methods are no longer suitable since they imply high frame recovery times.

OBJECTS OF THE INVENTION

The main object of this invention is to propose a method and an original device for recovering fast frame alignment, when the frame alignment word is distributed throughout the information to be transmitted.

Another object of this invention is to reinitialize a new search of the frame alignment word whenever a taken bit or bit group in the digital signal differs from that of same rank waited and corresponding in the alignment word.

SUMMARY OF THE INVENTION

In accordance with the above objects, there is provided a method for recovering a frame alignment word having bits distributed in a digital transmission signal wherein the frame alignment binary word has N predetermined bits distributed in the frame of the digital signal, each frame is divided into a M consecutive sectors, and each sector has a heading made up of bits of the alignment word in predetermined number such that the headings of all the consecutive sectors in a frame placed end to end form the alignment word.

Bit groups are taken from the digital signal at a sector frequency. Each of the bit groups has a bit number equal to the bit number in each heading. The bit groups thus taken separate bit packets in the digital signal having equal lengths.

The taken bits groups are stored to form a binary word having an increasing length up to a maximum length equal to that of the frame alignment word. The stored binary word is compared with each of N words composed of the frame alignment word and N-1 circular permutations thereof.

Rank k of one of the circular permutations of the frame alignment word for which the comparison on a number of N bits results in an identity is determined. The digital signal is then synchronized on the start of a $k^{th}$ sector delivered, after the comparison has given a positive result.

BRIEF DESCRIPTION OF THE DRAWING

Further features and advantages of the invention will be apparent from the following more particular description of preferred embodiments of the invention as illustrated in the accompanying drawings in which:

FIG. 3 is a detailed-circuit diagram of the recovering device; and

DESCRIPTION OF THE PREFERRED EMBODIMENTS

Figure 1:
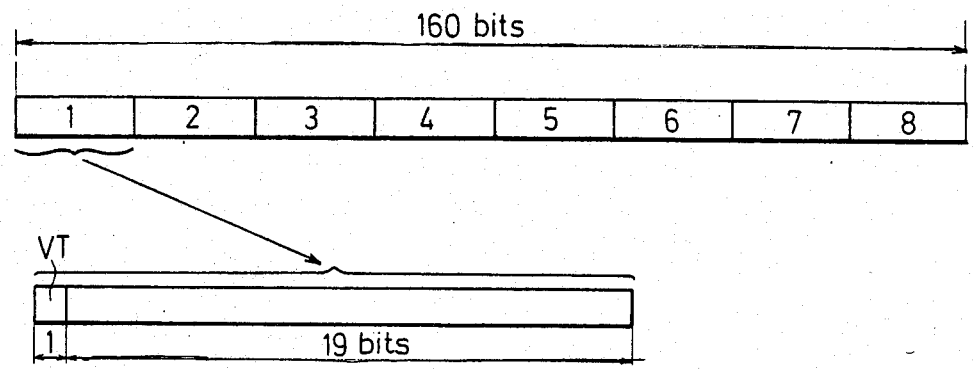
FIG. 1 depicts a frame of a digital signal wherein bits of a alignment word are distributed in the frame, on the basis of one bit to a frame sector.

As shown in FIG. 1, a frame of a digital signal includes 160 bits and is sub-divided into M=8 consecutive sectors each having 20 bits. A frame alignment word or synchronizing pattern carries N=8 bits VT distributed over the sectors. A first bit VT in each sector is one of the eight bits of the frame alignment word and forms a heading of the sector; the remaining nineteen bits make up a information bit packet to be transmitted.

Figure 2:
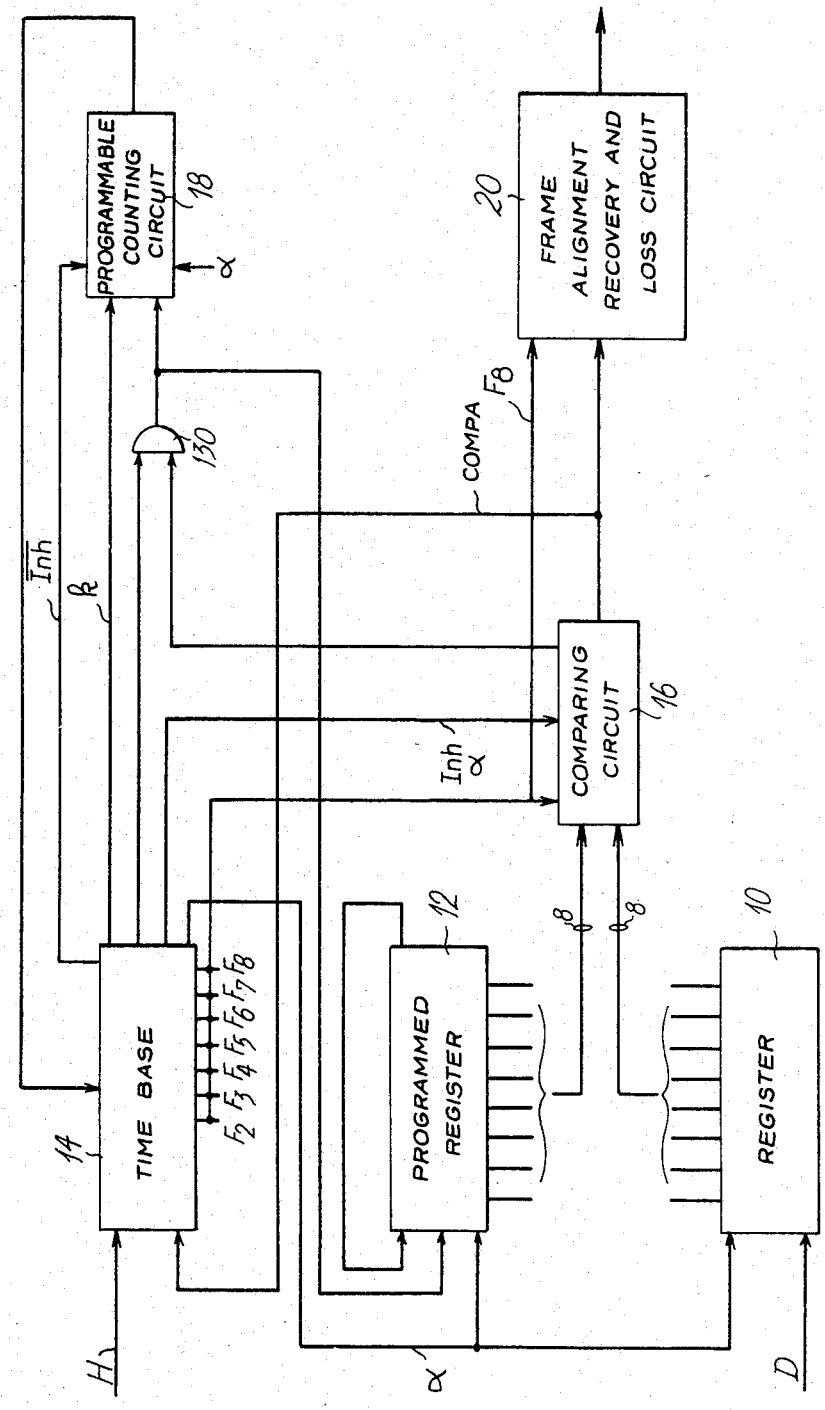
FIG. 2 is a functional block-diagram of a frame alignment recovering device embodying the invention.

Referring to FIG. 2, a frame alignment word recovering device mainly comprises a 8-stage shift register 10, a programmed 8-stage shift register, a time base 14, a comparing circuit 16, a 2-input gate AND 130, a programmable counting circuit 18, and a frame alignment recovery and loss circuit 20.

The first shift register 10 receives through a data input D, digital information structured as in the frame shown in FIG. 1. The information thus received is loaded into the register 10 at a sector frequency α equal to the digital signal bit frequency divided by the bit number in a sector, equal to twenty. For a complete frame delivered to the data input D, the register 10 extracts a word that is composed of eight bits or 1-bit groups regularly spaced out in the frame. Furthermore, the second shift register 12 delivers a programmed eight-bit word that corresponds to the frame alignment word or to one of permutations thereof obtained by loopback thereon, i.e. by eight successive shiftings of one bit. During a time slot corresponding to a sector, the word stored in register 10 is compared with the eight possible permutation configurations supplied by register 12.

Additionally, in the comparing circuit 16 connected to two 8-wire output buses of registers 10 and 12, comparisons are carried out progressively, during a frame, at the sector frequency, on one, then two, then three . . . , then eight bits acquired in register 10. The advantage of the foregoing is, for example, to provide as of the third sector the certainty that the bits collected in the register 10 do not correspond with any three consecutive bits of the frame alignment word. In this instance, the time base 14 that applies a clock signal at frequency α to registers 10 and 12, is reset by a signal COMPA delivered by the comparing circuit 16 and triggering the start of a new alignment word search cycle by anticipating or delaying the storing of the digital data signal in register 10 by at least one bit.

Figure 4:
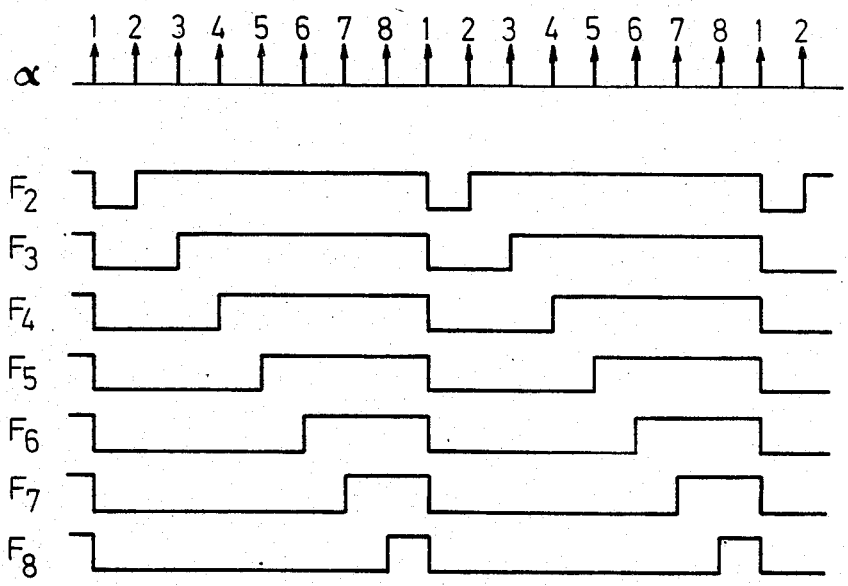
FIG. 4 shows waveforms of a sector frequency signal and seven frame alignment word bit enabling signals derived in a time base included in the recovering device, respectively.

The time base 14 receives a clock signal H at the bit rate of the received digital signal D and especially delivers the first clock signal at the sector frequency $\alpha$, and comparison enabling signals $F_2$, $F_3$, $F_4$, $F_5$, $F_6$, $F_7$, $F_8$ making it possible to carry out the successive bit-by-bit comparisons on 2, 3 . . . , 8 of the bits contained in registers 10 and 12. Signals $F_2$ to $F_8$ in this order are produced, as illustrated in FIG. 4, providing that for each sector, the comparison in circuit 16 has given a positive result whereat the data signal bit in the following sector may be "examined".

At the end of a frame indicated by the last comparison enabling signal $F_8$, if eight bit-by-bit comparisons between the content of register 10 and one of the frame alignment word configuration are positive, programmable counting circuit 18 is loaded with a rank value k of the permutation which gave the positive comparisons and, under the control of gate 130, is decremented at the rate of the sector frequency until zero. At the end of the down counting operation, the counting circuit 18 resets time base 14, i.e. synchronizes the time base with the first detected bit of the alignment word, after having let a sector number go by equal to the rank value k of the permutation which was loaded into programmable counting circuit 18.

The frame alignment recovery and loss circuit 20 receives the output signal COMPA from the comparing circuit 16. The COMPA signal state indicates for each frame period signaled by signal $F_8$ if a frame alignment word has been detected or not detected. An output of circuit 20 indicates a frame alignment recovery when the alignment word has been detected for at least a given number of consecutive frames, or indicates a frame alignment loss when none alignment word has been detected for at least another given number of consecutive frames. FIG. 3 is a detailed circuit-diagram of the frame alignment word recovering device shown with functional blocks in FIG. 2.

In the first register 10, data D is entered at the sector frequency $\alpha$ applied to a clock input Cl of register 10, as explained above. Second register 12 is initially programmed to the frame alignment word, and is looped back on itself to deliver through eight outputs all the circular permutations of the programmed frame alignment word.

Time base 14 mainly includes a counter-divider 122, a timer 124, a gate circuit 128 and also other electronic components such as a two-input gate OR 126, two three-input gates AND 154 and 159, an inverter 155 and a two-input gate OR 152. Recovered bit clock signal H is applied to a clock input Cl of counter-divider 122 carrying a division coefficient equal to the bit number in a sector, in order to deliver sector frequency signal $\alpha$ which, inter alia, times registers 10 and 12. Signal $\alpha$ is fed to a clock input of timer 124 via OR gate 126 the purpose of which will be explained later. Timer 124 delivers from seven outputs a sequence of signals $F_2$ to $F_8$ used for bit-by-bit comparisons between the contents of registers 10 and 12 in comparing circuit 16. FIG. 4 illustrates waweformes of signals $F_2$ to $F_8$ which are derived from sector frequency signal $\alpha$ in timer 124. Signals $F_2$ to $F_8$ carry the same frequency as the frame but have different cyclic ratios. For a frame, signal $F_2$ is normally delivered, i.e. is in the logic high state "1", as of the second sector to the last in the frame, whereas signal $F_3$ is only at the high state "1" as of the third sector to the last, and so on upto signal $F_8$ that is in the high state "1" only for the eight sector of the frame. This could, of course, be generalized to a sector number per frame other than eight.

In the time base 14, gate circuit 128 is intended for delivering a clock signal to the register 12 to monitor the circular permutations. For this purpose, circuit 128 receives, via a first input, the recovered bit clock signal H and, via a second input, an authorization signal which is provided from counter-divider 122 and lets through eight clock H pulses at the start of each sector signal period. In an alternative embodiment, the synchronous clock signal H fed to circuit 128 is replaced by a separate clock signal with a higher frequency. A permutation order signal delivered by an output of circuit 128 is applied to a first input of AND gate 130 to be transmitted to a clock input of register 12. A bit equality signal delivered from comparing circuit 16 is fed to a second input of AND gate 130 and breaks the permutation order signal once circuit 16 detects a bit-by-bit equality during the comparison between the binary values in registers 10 and 12, submitted for comparison. Further, register 12 is reloaded with the value of the programmed alignment word at each start of a sector, under the control of signal $\alpha$.

Comparing circuit 16 comprises eight OR-Exclusive gates 131 to 138 each having two inputs respectively connected to outputs of registers 10 and 12 providing two same-rank bits. Gates 131 to 138 compare the contents in registers 10 and 12 bit by bit. With the exception of the OR-Exclusive gate 131 that does the comparison between the least significant bits in the programmed word and the content of the register 10, outputs of the other OR-Exclusive gates 132 to 138 are connected to first inputs of AND gates 142 to 148 having second inputs receiving signals $F_2$ to $F_8$ delivered from the outputs of timer 124, respectively. The role of signals $F_2$ to $F_8$ is to progressively enable the comparisons on the bits acquired at the rate of frequency $\alpha$ in register 10, as and when the latter is loaded. For instance, if after having loaded three bits in register 10 none of the comparisons between these three bits and the three corresponding bits of the frame alignment word and each of seven permutations thereof derived under the control of the order signal outputting from AND gate 130 derives any three-bit identity, there is then no point in continuing to load other bits at the rate $\alpha$ in the register 10, from the data signal D. The device then commences a new frame alignment word acquisition phase as will be explained in detail below.

In comparing circuit 16, an output from OR-Exclusive gate 131 and outputs from AND gates 142 to 148 are respectively connected to inputs of an OR gate 150. An output of gate 150 is connected to the second input of AND gate 130 and an input D of type-D flip-flop 152. When a zero is obtained at the output of gate 150, i.e. when circuit 16 has recognized a bit-by-bit identity between the bits already loaded in the register 10 and the corresponding bits in the register 12 subjected to the circular permutations, any additional permutation for the actual sector time slot is then forbidden, and comparing circuit 16 remains frozen, until such time as commences the analysis of the following sector, the start of which corresponds to delivery of the next pulse of signal $\alpha$.

On the contrary to this, if the bit-by-bit comparison reveals no identity between the bits loaded in the register 10 and the corresponding bits resulting from all the circular permutations in register 12 during the actual sector time slot, it is of no use to continue to load the register 10 up to the end of the frame period, as explained earlier. The recovering device behaves as follows: flip-flop 152 in the comparing circuit records the value "1" then present on the output from the OR gate 150, at the sector frequency $\alpha$. Signal COMPA=1 is fed to a first input of AND gate 154 having a second input receiving signal $\alpha$ and then authorizes, via gate 154, a transmission of signal $\alpha$ to resetting inputs RS of the counter-divider 122 and timer 124 that are reset. Counter-divider 122 and timer 124 are reset upon a front of signal $\alpha$ such that, during the reinitialized process, the start of a new examined sector in the data stream D is shifted with at least one bit with respect to the start of the next sector which should have normally been identified had there been no reinitialization. In other words, the bits loaded in register 10 from the data stream D after reinitialization are shifted by one or more bits with respect to the bits that should normally have been recorded had the process not been interrupted. The fact of interrupting the process of identifying the frame alignment word without having waited for analysis of a data stream corresponding to a complete frame length allows a considerable gain in time to be made in achieving frame alignment.

If a correct comparison is found up to the eighth sector inclusive, the operation of the recovering device is as follows. In counting circuit 18, a programmable counter 118 receives, through a load input CH, a 3-bit permutation number k supplied from counter-divider 122 and corresponding to the permutation order during examination delivered from gate 130 and controlling, as already stated, circular bit permutation in register 12. The permutation order signal is transmitted to a down input D of counter 118 via a two-input AND gate 156 included in circuit 18 and controlled by a control signal referred to as $\overline{Inh}$. Signal Inh is derived from an output of AND gate 159 having inputs receiving signal $F_8$ characterizing last sector $F_8$ in a frame, a signal provided from an output of counter 118 that is in state "1" to indicate a binary value in counter 118 different from zero, and signal $\overline{COMPA}$ delivered from an inverter 160 connected to an output of flip-flop 152, respectively. Control signal $\overline{Inh}$ is delivered from inverter 155 connected the output of AND gate 159 that is also connected to inputs of OR gates 158 and 126. Control signal $\overline{Inh}$ inhibits a down counting in counter 118 when Inh=1 and, more precisely, under given conditions that are explained hereafter. Signal $\overline{Inh}$=1 is delivered by gate 159 when the comparison on the last sector time slot has given a result revealing an identity, that corresponds to $F_8$=1, COMPA=1 and a binary value in programmable counter 118 differring from zero. In this case, gate 156 is blocked so that the binary value in the counter 118 may be counted down at the sector frequency $\alpha$ applied to a clock input Cl of counter 118. Simultaneously, when the signal Inh is on "1", timer 124 is inhibited by signal Inh fed to an input of OR gate 126 having another input receiving signal $\alpha$ and an output connected to a clock input of the timer. Furthermore, the result of the comparison in the comparing circuit 16 is not taken into consideration by flip-flop D 152 due to inhibition brought about by feeding signal Inh to a clock input Cl of flip-flop 152 via OR gate 158 delivering sector frequency $\alpha$. When the decremented value in counter 118 is reduced to the value zero, AND gate 156 is then closed and OR gates 126 and 158 are opened thereby permitting operations as previously described.

The down incrementation for a sector time slot number equal to the rank k of the permutation having produced the bit-by-bit identity between the contents in registers 10 and 12 contributes to synchronize time base 14 and, particularly, timer 124 on the start of the frame alignment word stored in register 10.

Frame alignment recovery and loss circuit 20 comprises inverter 160 and a shift register 162 that receives on a data input the signal $\overline{COMPA}$ delivered by the inverter 160 and on a clock input Cl the signal $F_8$. In circuit 20, outputs from consecutive stages in register 162 are connected, on the one hand, to inputs of an AND gate 164 having an output connected to a set input S of a flip-flop RS 166, and on the other hand, to inputs of a NOR gate 168 having an output connected to a reset input R of flip-flop 166. Outputs Q and $\overline{Q}$ of flip-flop 166 characterize the frame alignment state. In the embodiment illustrated in FIG. 3, four consecutive outputs from register 162 are connected to four inputs of AND gate 164 and four inputs of NOR gate 168 thereby indicating that the frame alignment is recovered when register 162 and AND gate 164 have recognized a frame alignment word in at least four consecutive frames. In fact, each time that comparing circuit 16 has detected a eight-bit identity at the end of a frame period, signal $\overline{COMPA}$=1 is stored in register 162 under the control of frame end signal $F_8$. On the contrary thereto, frame alignment is considered lost when register 162 and NOR gate 168 have not found frame alignment words in at least four consecutive frames.

According to other embodiments, frame alignment recovery and loss criteria are different. It then suffices to have a register 162 having a stage number equal to the greatest number of both input numbers of gates 164 and 168, these latters being different, and to connect a number of register 162 outputs corresponding to the adopted criteria to gates 164 and 168.

On a third input, AND gate 154 receives a signal $V_{TACQ}$ delivered from output $\overline{Q}$ of flip-flop 166. As a result, until such time as $V_{TACQ}$=0 and also the frame alignment is no longer considered as recovered, there is no possibility of resetting counter-divider 122 and timer 124 and reinitializing time base 144.

In other embodiments, the heading in each frame sector comprises a predetermined number of alignment word bits. For example, the frame alignment word includes N=16 bits, where two bits constitute the first two bits in each of M=8 frame sectors. In this example, the sector frequency signal $\alpha$ is composed of pulses each during two bits in the digital data signal D to take two-bit groups in signal D to be stored in register 10, each of registers 10 and 12 having 16 stages.

What I claim is:

1. A method of recovering a frame alignment word having bits distributed in a digital transmission signal, said frame alignment word having a predetermined number N of bits distributed in a frame of said digital signal, said frame being divided into M consecutive sectors, each of said sectors including first and second parts, said first part being a heading including a predetermined number of alignment bits, the heading bits of all said consecutive sectors in said frame placed end to end forming said frame alignment word, said second part being a bit packet corresponding to digital signal information, said method comprising taking bit groups from said digital signal at a sector frequency at which said sectors are transmitted in said digital signal, each of said bit groups having a number of digital signal consecutive bits equal to said number of bits in each heading, storing said taken bit groups to form a binary word having an increasing length up to a maximum length equal to that of said frame alignment word, comparing said stored binary word with each of N words composed of said frame alignment word and N-1 circular permutations thereof, determining when the comparison of a number of N bits results in an identity to indicate rank k of one of said circular permutations of said frame alignment word, and completing synchronization of said digital signal at the start of a $k^{th}$ sector after said comparison has indicated an identity.

2. The method of claim 1 further comprising the steps of performing bit-by-bit comparisons of the stored bits in said increasing-length binary word with the bits of corresponding ranks in said frame alignment word and its N-1 circular permutations whenever at least one bit of said sampled bit groups is stored to form said increasing-length binary word, and reinitializing the steps of said method when none of said N comparisons has yielded an identity.

3. The method of claim 2 wherein the reinitialization step is such that the first taken bit group after reinitialization differs from that which would normally have been taken had the steps of claim 7 not been reinitialized, and sampling the following bit groups at said sector frequency.

4. A device for recovering a frame alignment word having bits distributed in a digital transmission signal, said frame alignment word having a predetermined number N of bits distributed in a frame of said digital signal, said frame being divided into M consecutive sectors having ranks 1,2 . . . (1-M), M, each of said sectors being divided into first and second parts, said first part being a heading including a predetermined number of alignment bits, the heading bits of all said consecutive sectors in said frame placed end to end forming said frame alignment word, said second part being a bit packet corresponding to digital signal information, said device comprising:

a time base source for periodically deriving a sector frequency with which said sectors are transmitted in said digital signal and at a frame frequency, a sequence of signals determining M consecutive time slots, each of said time slots being equal in length to a sector, a first N-bit shift register controlled by said time base responsive to said digital signal and timed at said sector frequency for progressively storing bit groups taken from said digital signal, each of said bit groups having a number of digital signal consecutive bits equal to said number of bits in each heading, a second N-bit shift register having stored said frame alignment word and looped back on itself for deriving all N-1 circular permutations of said alignment word under the control of said time base, said circular permutations being of ranks 1 . . . k . . . (N-1), comparing means connected to said first and second shift registers and controlled by said time base source for comparing bit-by-bit a binary word derived from said first register with said alignment word and said circular permutations thereof, the binary word derived from said first register having an increasing length up to a maximum length equal to that of said frame alignment word, and storing means connected to said comparing means and controlled by said time base source for storing rank k of one of said circular permutations for which an identity is detected by said comparing means between contents of said first and second registers, the sector frequency of said time base source being inhibited by said comparing means once said identity is detected, said sector frequency being inhibited during one of said consecutive time slots positioned in rank M of said frame and remaining inhibited for a number of time slots equal to said rank k of said stored permutation whereby frame alignment is recovered.

5. The device of claim 4 further comprising frame alignment recovery and loss means connected to said comparing means for deriving a control signal indicating that the frame alignment is recovered in response to said comparing means indicating a predetermined number of identities between said contents of said two shift registers during successive time slots of rank M.

6. The device of claim 4 further including means for controlling said comparing means at said sector frequency for carrying out the comparisons whenever said first register has stored a bit group, each comparison being carried out only on the gorup bits effectively stored in said first register during said signal sequence derived by said time base source, resetting means for reinitializing said time base source with a time-slot shift in response to none of the comparisons between said stored group bits in said first register and the corresponding bits of said frame alignment word and said circular permutations thereof being indicated as identical.

* * * * *